US008199477B2

(12) United States Patent
Mathew et al.

(10) Patent No.: US 8,199,477 B2
(45) Date of Patent: Jun. 12, 2012

(54) PORTABLE COMPUTERS WITH SPRING-MOUNTED DISPLAYS

(75) Inventors: Dinesh C. Mathew, Fremont, CA (US); Thomas W. Wilson, Jr., Saratoga, CA (US); Nicholas Alan Rundle, Santa Clara, CA (US); Bryan W. Posner, La Selva Beach, CA (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 12/483,205

(22) Filed: Jun. 11, 2009

(65) Prior Publication Data

US 2010/0315769 A1 Dec. 16, 2010

(51) Int. Cl.
*G06F 1/16* (2006.01)
(52) U.S. Cl. ......... 361/679.29; 361/679.26; 361/679.27; 349/58; 345/905; 312/223.1; 312/223.2
(58) Field of Classification Search ............... 361/679.29
See application file for complete search history.

(56) References Cited

U.S. PATENT DOCUMENTS

| | | | | |
|---|---|---|---|---|
| 5,570,267 | A * | 10/1996 | Ma | 361/679.21 |
| 5,748,270 | A | 5/1998 | Smith | |
| 5,940,153 | A | 8/1999 | Castaneda et al. | |
| 6,128,183 | A * | 10/2000 | Uchiyama et al. | 361/679.27 |
| 6,392,723 | B1 * | 5/2002 | Sugiyama et al. | 349/58 |
| 6,483,719 | B1 | 11/2002 | Bachman | |
| 6,507,377 | B1 * | 1/2003 | Jung | 349/60 |
| 6,507,484 | B2 * | 1/2003 | Fukuyoshi | 361/679.26 |
| 6,828,721 | B2 * | 12/2004 | Wakita | 313/491 |
| 6,870,582 | B2 * | 3/2005 | Hayashimoto et al. | 349/58 |
| 6,930,644 | B2 * | 8/2005 | Konishi et al. | 343/702 |
| 7,002,645 | B2 * | 2/2006 | Fukayama et al. | 349/58 |
| 7,004,614 | B2 * | 2/2006 | Tsai et al. | 362/633 |
| 7,013,558 | B2 | 3/2006 | Bachman | |
| 7,126,651 | B2 * | 10/2006 | Kim et al. | 349/58 |
| 7,209,195 | B2 * | 4/2007 | Lin | 349/58 |
| 7,215,539 | B2 * | 5/2007 | Tanaka et al. | 361/679.06 |
| 7,274,560 | B2 * | 9/2007 | Jeong et al. | 361/679.27 |
| 7,304,837 | B2 * | 12/2007 | Lo et al. | 361/679.27 |
| 7,545,629 | B1 * | 6/2009 | Bauer et al. | 361/679.27 |
| 7,679,889 | B2 * | 3/2010 | Sakata | 361/679.01 |
| 7,697,273 | B2 * | 4/2010 | Kawano | 361/679.21 |

(Continued)

OTHER PUBLICATIONS

Wang et al., U.S. Appl. No. 12/119,986, filed May 13, 2008.

*Primary Examiner* — Anthony Q Edwards
(74) *Attorney, Agent, or Firm* — Treyz Law Group; G. Victor Treyz; David C. Kellogg

(57) ABSTRACT

An electronic device housing may contain a display module. The display module may contain layers of material such as a color filter layer and a thin-film transistor layer. These layers of material may be mounted in a display module chassis. A cover glass may cover the display module. The housing may have springs that mate with corresponding holes in the chassis of the display module to hold the display module in place within the housing. The springs may flex about a flex axis that is perpendicular to a planar rear housing surface and the planar layers of the display module. A disassembly tool may be inserted into a gap between the cover glass and housing sidewalls. When the disassembly tool is rotated, a fin on the tool may press against an engagement structure in the spring and may release the spring from the display module.

23 Claims, 12 Drawing Sheets

U.S. PATENT DOCUMENTS

| | | | |
|---|---|---|---|
| 7,864,261 B2* | 1/2011 | Chen et al. | 349/58 |
| 7,907,230 B2* | 3/2011 | Goto et al. | 349/58 |
| 7,940,287 B2* | 5/2011 | Kim et al. | 345/102 |
| 2001/0001591 A1* | 5/2001 | Nakajima et al. | 361/683 |
| 2001/0036057 A1* | 11/2001 | Fukuyoshi | 361/681 |
| 2002/0080297 A1* | 6/2002 | Sung | 349/58 |
| 2003/0197111 A1* | 10/2003 | Morimoto et al. | 248/694 |
| 2004/0141102 A1* | 7/2004 | Lin | 349/58 |
| 2006/0012969 A1 | 1/2006 | Bachman | |
| 2006/0148425 A1 | 7/2006 | Carlson | |

* cited by examiner

PORTABLE COMPUTERS WITH SPRING-MOUNTED DISPLAYS

BACKGROUND

This invention relates to electronic devices and, more particularly, to electronic devices that have displays such as portable computers.

Portable computers typically have upper and lower housing portions that are connected by a hinge. The lower housing portion contains components such as printed circuit boards, disk drives, a keyboard, and a battery. The upper housing portion contains a display. When the computer is in an open configuration, the upper housing portion is vertical and the display is visible to the user of the portable computer. When the computer is closed, the upper housing lies flat against the lower housing. This protects the display and keyboard and allows the portable computer to be transported.

Portable computer displays typically contain fragile structures such as layers of glass and can be challenging to mount properly within the upper housing. If care is not taken, the display and the surrounding portions of the upper housing will be bulky and unsightly. At the same time, the elimination of certain structures in the display may result in display that is overly fragile. This could lead to damage to the display during normal use.

It would therefore be desirable to be able to provide improved display structures in electronic devices such as portable computers.

SUMMARY

An electronic device such as a portable computer may have a housing in which a display module is mounted.

The housing may be formed from a material such as metal and may have a planar rear surface and peripheral housing sidewalls. The display module may contain layers of material such as a color filter layer, polarizer layers, a liquid crystal layer, and a thin-film transistor layer. These layers of material may be mounted in a metal display module chassis member.

A cover glass member may cover the display module. The cover glass may have a peripheral edge that is adjacent to the peripheral housing sidewalls. A gap may be formed between the cover glass peripheral edge and the peripheral housing sidewalls. The gap may be filled with an elastomeric trim member.

The housing may have springs that mate with corresponding holes in the chassis member of the display module to hold the display module in place within the housing. The springs may flex about a flex axis that is perpendicular to a planar rear surface of the housing and the display module. A disassembly tool may be inserted into the gap between the cover glass and housing sidewalls after the trim has been removed. The end of the shaft of the disassembly tool may be received within a pilot hole in the housing. When the disassembly tool is rotated, a fin on the tool may press against an engagement structure in the spring and may release the spring from the display module. This allows the display module to be removed from the housing for servicing.

Further features of the invention, its nature and various advantages will be more apparent from the accompanying drawings and the following detailed description of the preferred embodiments.

DETAILED DESCRIPTION

Figure 1:
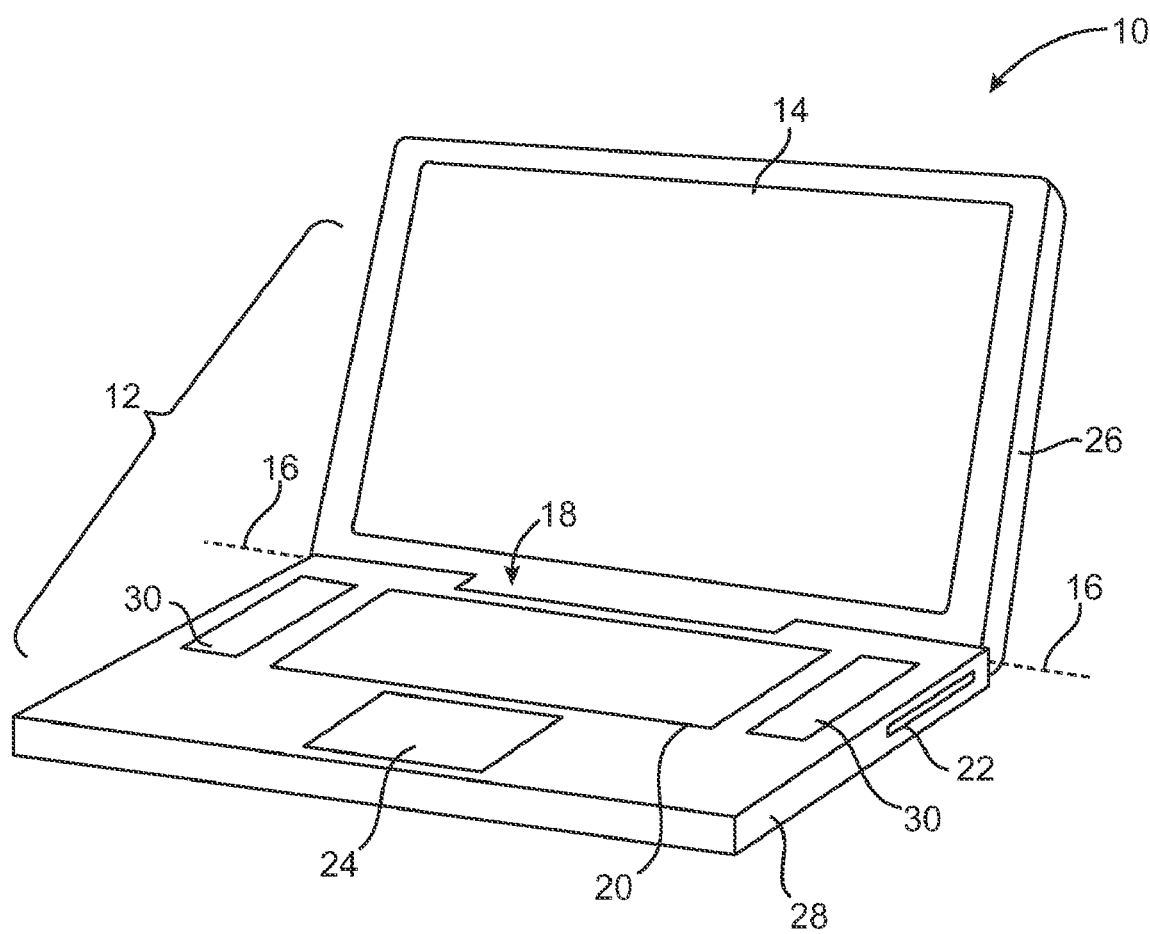
FIG. 1 is a perspective view of an illustrative portable computer with display structures in accordance with an embodiment of the present invention.

Electronic devices such as computers, handheld devices, computer monitors, televisions, cellular telephones, media players, and other equipment may have displays. An example is presented in FIG. 1. In the example of FIG. 1, device 10 is a portable computer. This is merely illustrative. Device 10 may, in general, be any suitable electronic device. The portable computer arrangement of FIG. 1 is an example.

As shown in FIG. 1, portable computer 10 may have housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Housing 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover, lid, or display housing, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12. Speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). Display 14 may contain a number of layers of material. These layers may include, for example, layers of optically transparent glass. Layers of plastic and optical adhesive may also be incorporated into display 14. In a liquid crystal display, layers of polarizer, light diffusing elements and light guides for backlight structures, a liquid crystal layer, a color filter layer, and a thin-film transistor array that drives the image pixels in the display may be incorporated into the display. The collection of material layers and associated support structures that are used to form display 14 are sometimes referred to as a module. Display 14 may therefore sometimes be referred to as a display module.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
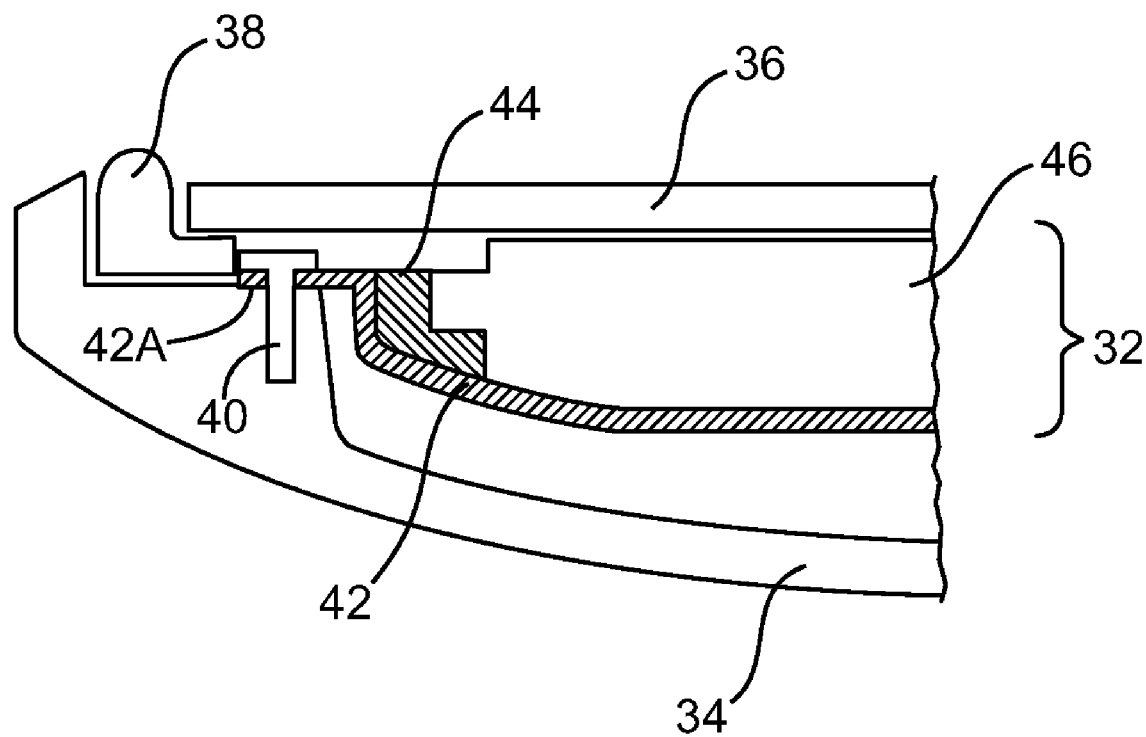
FIG. 2 is a cross-sectional side view of a conventional liquid crystal display (LCD) module in a portable computer display housing.

A cross-sectional side view of a conventional liquid crystal display (LCD) display module is shown in FIG. 2. As shown in FIG. 2, display module 32 may have display structures 46. Display structures 46 may include structures such as an upper polarizer layer, a color filter, a thin-film transistor glass layer, a lower polarizer, and a layer of light-guide structures such as light guides and diffuser layers. Display module 32 may also have a plastic chassis member such as plastic chassis member 44 and a metal chassis member such as metal chassis member 42 into which the layers of glass and other display module structures may be mounted. Cover glass 36 may be placed on top of structures 46. Elastomeric trim member 38 (sometimes referred to as a gasket) is used to form a cushioned interface between cover glass layer 36 and housing 34. This helps to prevent damage to cover glass layer 36.

Metal chassis member 42 may have a tab 42A with a hole through which screw 40 passes. Screw 40 may be screwed into a threaded hole in housing 34. In the arrangement of FIG. 2, housing 34 is formed of aluminum. The presence of the extending tab portion 42A of chassis 42 allows module 32 to be firmly secured in housing 34, but adds undesirable width to the perimeter of display module 32.

The width associated with use of tabs such as tab 42A can adversely affect device size and aesthetics. Tabs 42A and screws 40 are covered from view by placing a band of opaque ink around the display. However, this band of ink creates an unused border region around the periphery of the display. Wide borders consume space without providing the user with more viewable display area and can be unsightly.

The border portion of display 14 in device 10 of FIG. 1 can exhibit a narrow width, because display 14 can be mounted in housing 12 without use of conventional display chassis tabs such as tabs 42A. With one suitable arrangement, which is sometimes described herein as an example, engagement structures such as springs (snaps) and mating holes or other spring engagement structures may be used to secure a display module in an electronic device housing. The engagement structures may consume less with than conventional display chassis tabs and may enhance the assembly and disassembly process.

Figure 3:
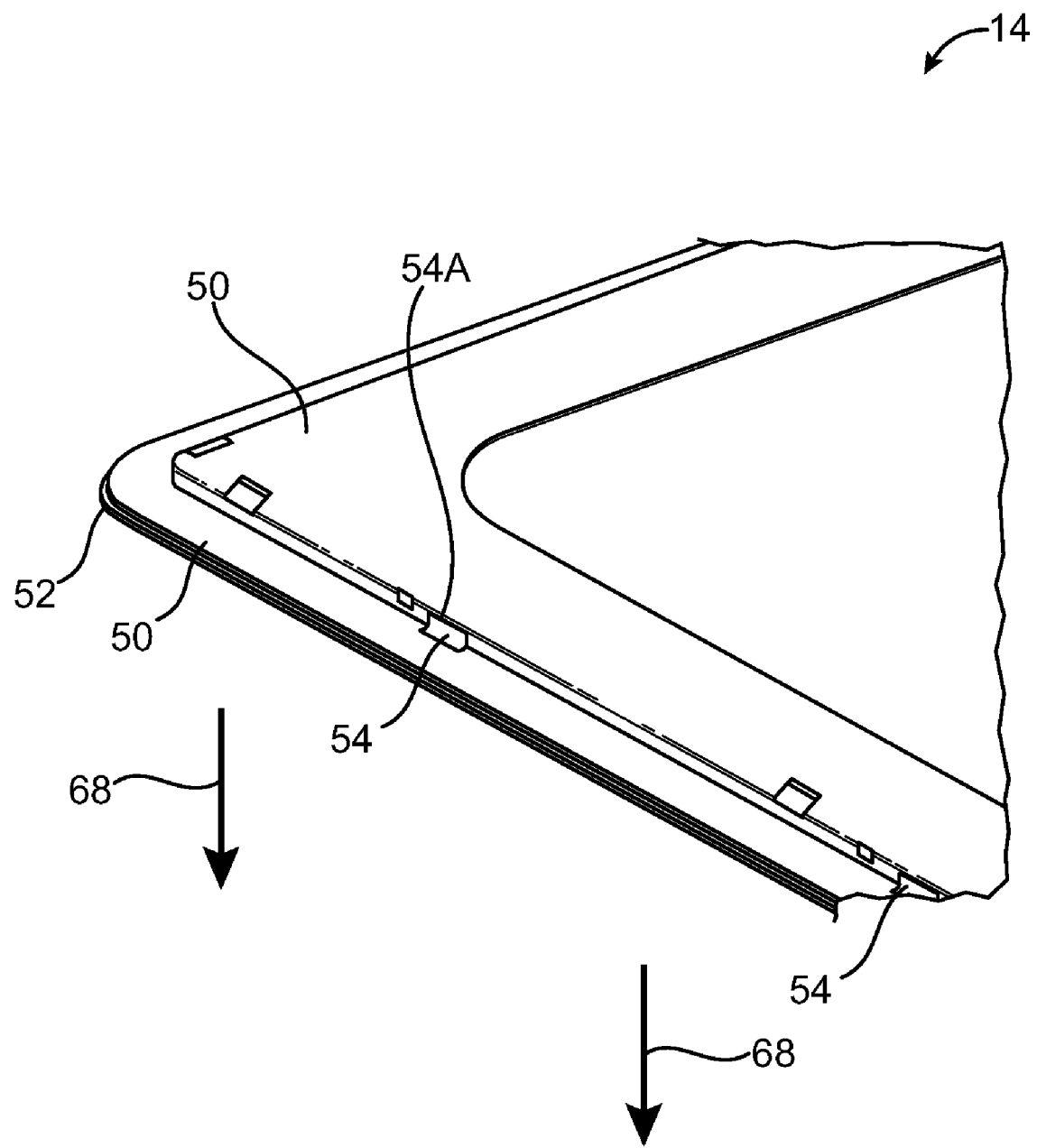
FIG. 3 is a perspective view of a portion of a display with spring engagement structures in accordance with an embodiment of the present invention.
Figure 4:
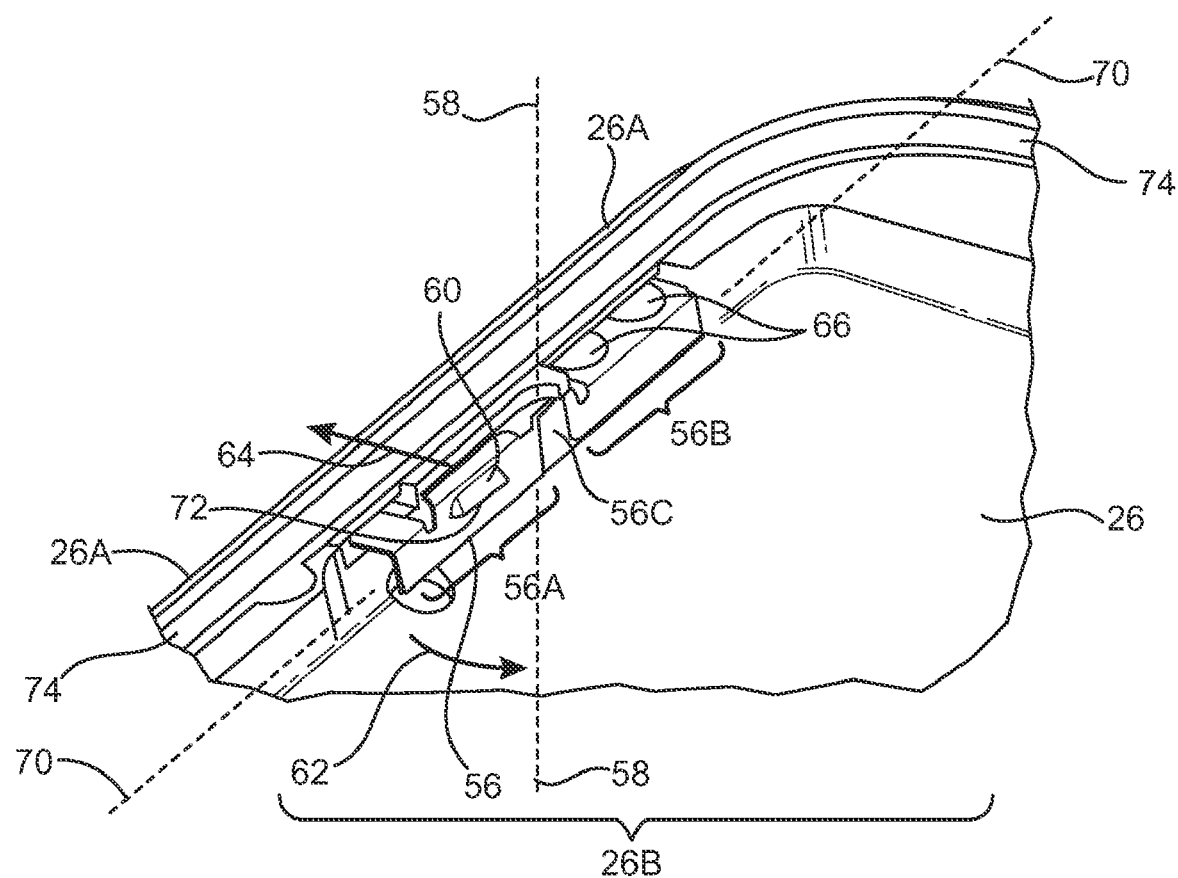
FIG. 4 is a perspective view of a portion of an electronic device housing having springs that can mate with the spring engagement structures of the type shown in FIG. 3 when a display module of the type shown in FIG. 3 is mounted with the housing in accordance with an embodiment of the present invention.

An illustrative configuration is shown in FIGS. 3 and 4. FIG. 3 is a perspective view of a portion of a display module with holes. FIG. 4 is a perspective view of a housing with springs that may mate with the display module holes of FIG. 3. Other arrangements are possible. For example, springs may be attached to a display module and holes may be formed in a housing or combinations of housing springs and display module springs may be used. Springs with holes that mate with rigidly mounted prongs may also be used. The arrangement of FIGS. 3 and 4 is sometimes described herein as an example, but is merely illustrative.

As shown in FIG. 3, display module 14 may have a chassis 50 (sometimes referred to as a frame). Chassis 50 may be formed from metal or other suitable materials and may enclose the inner (inactive) regions of display 14. Chassis 50 may cover the entire planar inner surface of display 14 or may be formed around the periphery of the planar inner surface of display 14. Plastic chassis members may be incorporated into display module to hold display structure layers such as a color filter glass layer and a thin-film transistor substrate layer. Metal chassis 50 may cover plastic chassis members (e.g., a plastic peripheral frame, etc.).

Cover glass 52 may be used to form the outermost surface of the display. When assembled in device 10, cover glass 52 may cover the potentially fragile layers of the display module and thereby prevent the display module from being damaged during use. In the orientation of FIG. 3, display 14 is facing downwards, so image light emitted from display 14 travels in direction 68.

Chassis 50 may have openings such as openings 54. Openings 54 may be rectangular or may have other suitable shapes for engaging spring members on the device housing. Because openings 54 are configured to receive mating spring prongs, openings 54 may sometimes be referred to as spring engagement structures, spring engagement openings, or spring engagement holes. There may be any suitable number of openings 54 in chassis 50. With one suitable arrangement, there may be about 1-20 openings 54 each of which mates with a respective spring. In configurations with more than one spring and more than one corresponding hole 54, the holes may be distributed about the periphery of chassis 50 and the springs may be similarly distributed about the peripheral sidewalls of housing 26. The use of a fairly even spacing between respective openings 54 may help ensure that display module 14 is securely fastened to housing 12.

Openings 54 may form laterally extending edges along the periphery of display module chassis 50. These edges lie in the plane of display module 14 and form horizontal surfaces against which springs on the device housing may bear to hold display module 14 within the device housing. A perspective view of a portion of device housing 26 is shown in FIG. 4. As shown in FIG. 4, springs such as spring 56 (also sometimes referred to as snaps or flexible engagement structures) may be mounted around the periphery of housing 26. Each spring may have an inwardly protruding spring prong such as prong 60 that mates with a corresponding one of the openings 54 in display module chassis 50.

Spring 56 may have a portion 56B that is mounted to housing 26. Portion 56B may be attached to housing 26 using screws 66 or other suitable attachment mechanisms (e.g., welds, adhesive, etc.). When screws are used in attaching portion 56B to housing 26, housing 26 may be provided with threaded holes into which screws 66 may be screwed.

Spring 56 also has portion 56A and portion 56C. Portion 56C lies between portions 56A and 56B. Spring 56 may be formed from a flexible metal such as spring steel. The flexible nature of spring 56 allows spring portion 56A to be deflected in directions 64 and 62 about flex axis 58 (e.g., at portion 56C). Longitudinal axis 70 of spring 56 may run parallel to housing edge 26A of housing 26. Flex axis 58 may be oriented at a 90° angle with respect to longitudinal axis 70. When oriented in this way, flex axis 58 is perpendicular to planar rear housing surface 26B and is perpendicular to the planar front surface of the display, so that spring 56 flexes in the same plane as rear housing surface 26B. Because the longitudinal axis of spring 56 runs along the edge of housing 26 and because spring 56 flexes about an axis that is perpendicular to the plane of rear housing surface 26B and the plane of display module 14, a relatively long spring may be used that provides satisfactory flex action, without unduly widening the inactive boarder region between display 14 and housing edge 26A.

Spring prong 60 may have an angled shape. As display module 14 is inserted into housing 26, portions of display module chassis 50 bear against the inwardly angled surface of prong 60 and deflect spring 60 so that spring portion 56A flexes outwardly in direction 64 about flex axis 58. After display module 14 has been inserted sufficiently into housing 26, the restoring force produced by the flexed spring shape of spring 56 causes portion 56A to flex inwardly in direction 62 about axis 58. The inward movement of spring portion 56A causes lower edge 72 of spring prong 60 to catch edge 54A of opening 54 (FIG. 3). This holds display module 14 in place within housing 26. Elastomeric trim 74, which is sometimes referred to as a gasket, may be formed in a ring around the inner surface of peripheral housing edge 26A. Trim 74 may serve as an interface that fills the gap between the peripheral edge of cover glass 52 and the opposing inner surface of housing edge 26A.

Figure 5:
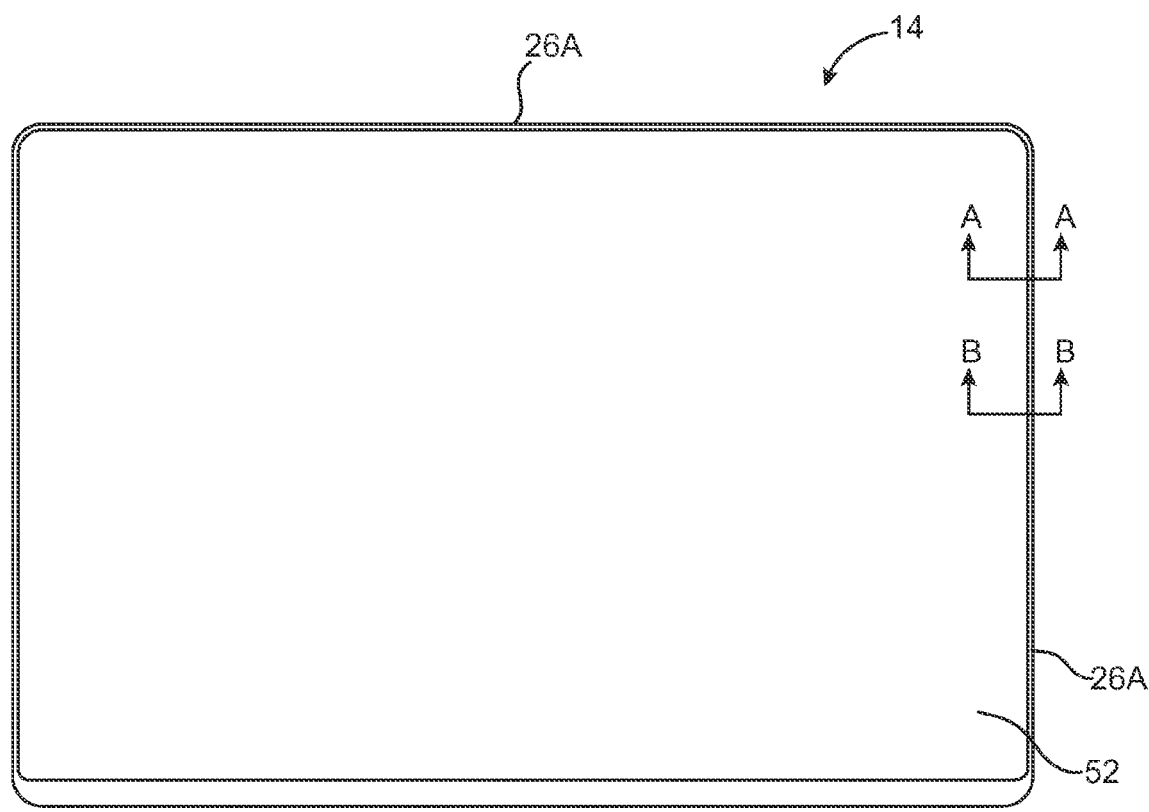
FIG. 5 is top view of an illustrative display module in accordance with an embodiment of the present invention.

A front (top) view of upper housing 26 in which display module 14 has been mounted is shown in FIG. 5. As shown in FIG. 5, display module 14 may be covered by cover glass 52. Edge 26A of housing 26 may extend around the peripheral edges of cover glass 52. Trim 74 (FIG. 4) may be interposed between edge 26A and cover glass 52 (e.g., to prevent damage to the outer glass surfaces of cover glass 52).

Figure 6:
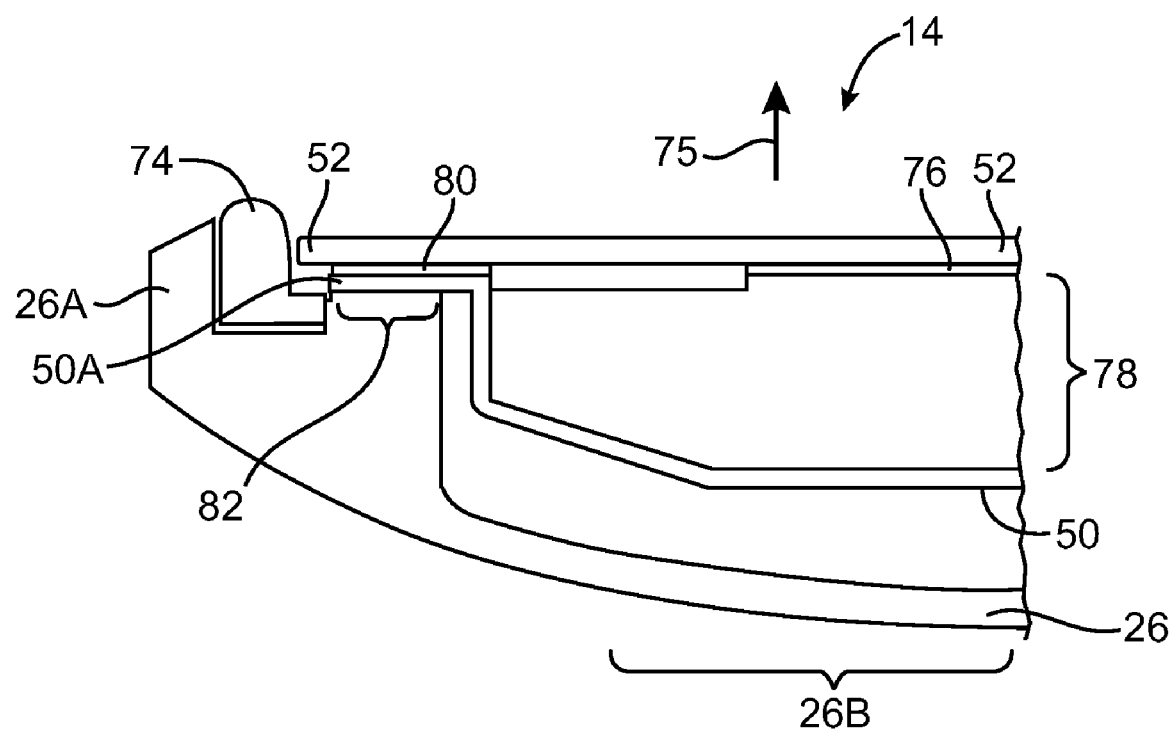
FIG. 6 is a cross-sectional side view of the display module of FIG. 5 taken along the line A-A in FIG. 5 in accordance with an embodiment of the present invention.

FIG. 6 is a cross-sectional view of display module 14 in housing 26 taken along line A-A of FIG. 5. As shown in FIG. 6, display module 14 may include display structures 78. Display structures 78 may include layers of the display that form images for the user of device 10. Display structures 78 may produce an image using any suitable display technology (e.g., light-emitting diodes such as an array of organic light-emitting diodes, liquid crystal display pixels, plasma-based pixels, etc.). An arrangement in which display module 14 and display structures 78 are based on liquid crystal display (LCD) technology is sometimes described herein as an example. The use of LCD structures in display module 14 is, however, merely illustrative. Display module 14 may, in general, be formed from any suitable type of display structures.

In configurations in which display module 14 is based on LCD technology, display structures 78 may include an upper polarizer layer and a lower polarizer layer. At the bottom of the stack of materials in structures 78, backlight structures may be used to provide backlight for module 14. These backlight structures may include light guide structures and diffuser layers. The backlight structures may help route light from a light-emitting diode light source or other backlight source through the layers of module 14 in direction 75. Structures 78 may also include a thin-film transistor substrate glass layer having an array of thin-film transistors. A color filter glass layer may be mounted above the thin-film transistor array. The color filter glass layer may contain an array of optical filters of different colors that match the locations of the transistors on the thin-film transistor substrate. These optical filters provide display module 14 with the ability to display color images. The color filter layer may be formed from glass into which dye of different colors has been impregnated, from a glass layer coated with a pattern of colored dye, from a glass or plastic layer that is covered with a pattern of thin colored filter structures (e.g., filters formed from polymer or glass containing dye), or any other suitable color filter structures. A liquid crystal layer may be interposed between the thin-film transistor layer and the color filter layer and may be controlled by the electric fields produced by the thin-film transistors on the thin-film transistor layer.

Display structures 78 may be mounted in supporting structures. For example, display structures 78 may be mounted in metal chassis frame 50. Plastic chassis structures and other supporting members may also be incorporated into display structures 78.

As shown in the cross-sectional view of FIG. 6, the portion of the display at section line A-A of FIG. 5 may have a chassis member with a supporting protrusion such as lip 50A. Lip 50A may be formed by a bent metal portion of metal chassis member 50. Housing 26 may be configured to form a ledge in region 82. The surface of the housing ledge in region 82 may lie in a plane that is parallel to the plane of rear planar housing surface 26B (as an example). With this type of configuration, planar lip portion 50A of display module chassis member 50 may rest on the planar ledge portion of housing 26 in region 82.

Adhesive 80 and adhesive 76 may be used to secure cover glass 52 to the other structures of display module 14. Adhesive 80 may be located on lip 50A of chassis member 50. In this portion of display module 14, no light is being emitted upwards in direction 75. Adhesive 80 therefore need not be optically transparent. Adhesive layer 76, however, is located at least partly above the active center portion of display 14. Adhesive layer 76 may therefore be formed from an optically clear substance. Examples of suitable adhesives include ultraviolet-light-cured and heat-cured epoxies. If desired, epoxy or other suitable adhesive may be used under lip 50A.

Figure 7:
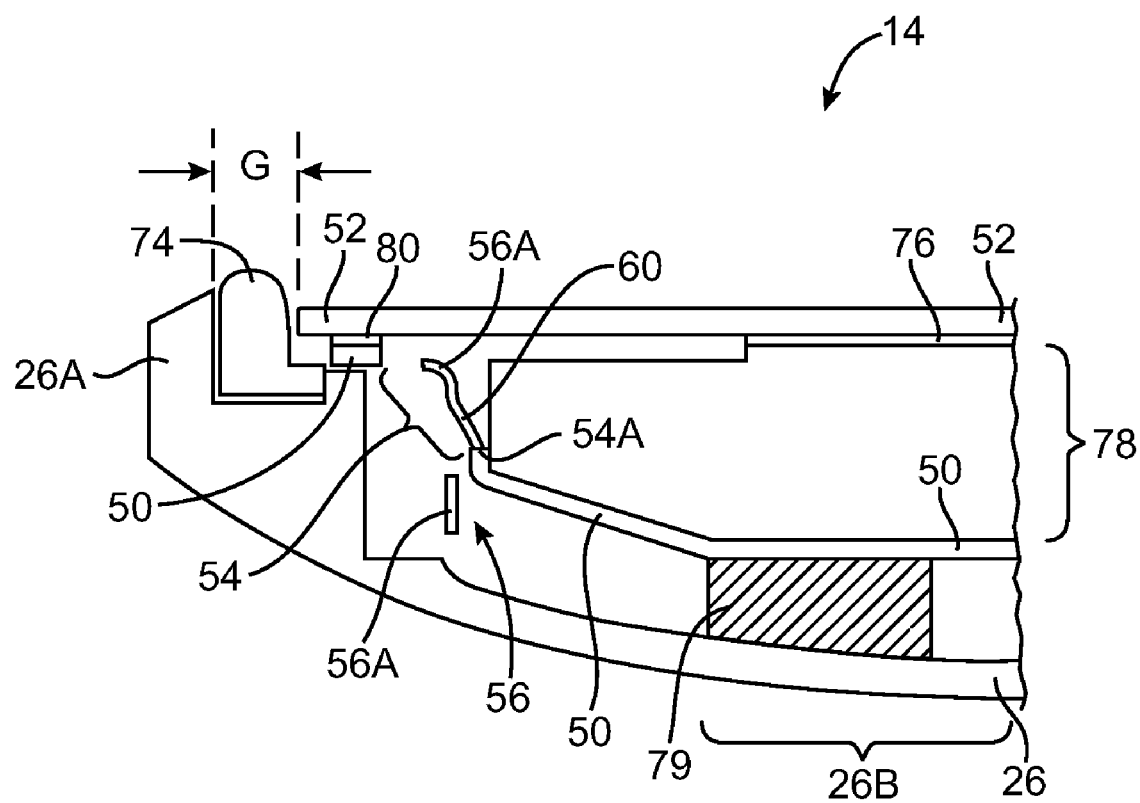
FIG. 7 is a cross-sectional side view of the display module of FIG. 5 taken along the line B-B in FIG. 5 in accordance with an embodiment of the present invention.

As shown in the cross-sectional view of FIG. 7, the portion of the electronic device at section line B-B of FIG. 5 may include spring 56 (from housing 26) and corresponding hole 54 (from display module 14). In the configuration of FIG. 7, display 14 is mounted within housing 26 so that the lower edge of spring prong 60 bears against the upwards facing lower edge 54A of display module chassis member 50 in opening 54. Foam member 79 may help to support the lower surface of chassis member 50 on rear surface 26B of housing 26.

Figure 8:
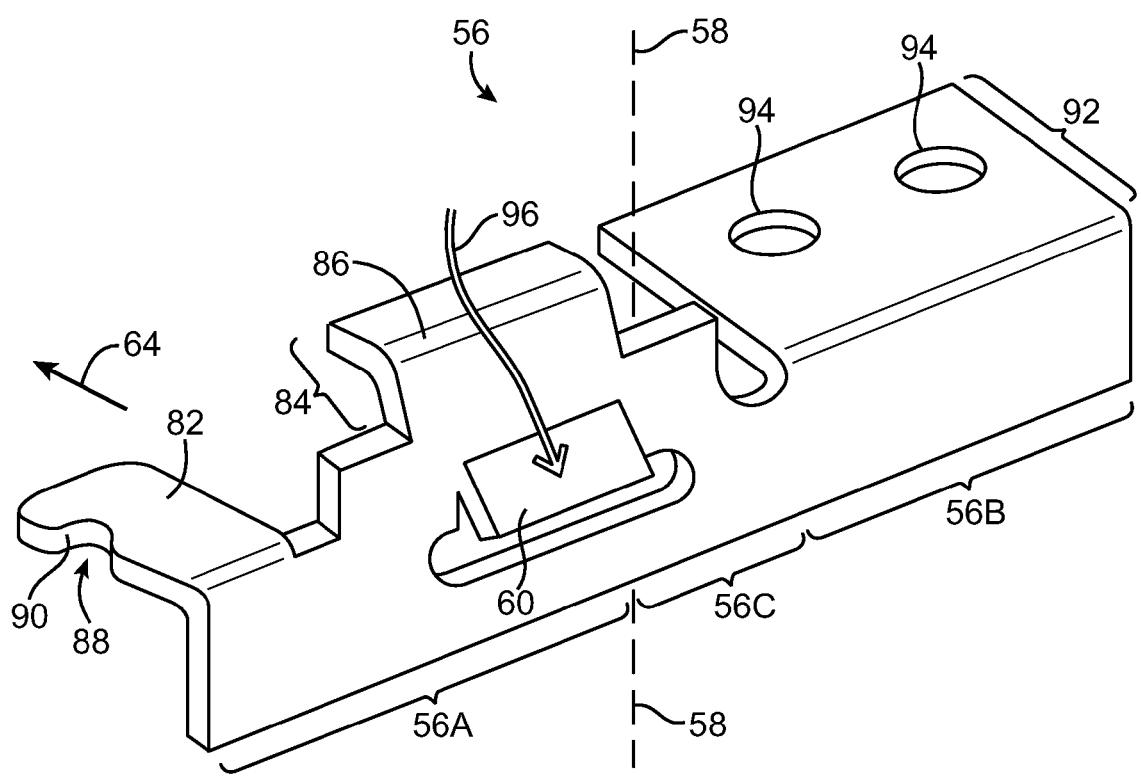
FIG. 8 is a perspective view of an illustrative spring that may be used in mounting a display module in an electronic device housing in accordance with an embodiment of the present invention.

A perspective view of spring 56 is shown in FIG. 8. As shown in FIG. 8, spring 56 may have prong 60 for engaging with the surface of hole 54 in display module chassis 50. Sloped portion 84 of spring 56 forms a lead-in tab with a slanted surface. When display module 14 is inserted into housing 26, chassis 50 will press against sloped portion 86 and the sloped surface of prong 60. This will bias spring portion 56A in direction 64 about flex axis 58, while spring portion 56B remains at rest against housing 26. Spring portion 56B is secured to housing 26 using screws 66 (FIG. 4). Screws 66 pass through holes 94 in horizontal planar portion 92 of spring portion 56B. As spring 56 bends in this way, display module chassis member 50 will ride along surface 86 and the sloped surface of prong 60 following path 96. Once display module 14 has been inserted sufficiently into housing 26 for hole 54 to become aligned with prong 60, spring 56 will return to its original unflexed state (i.e., the shape shown in FIG. 8). In this configuration, prong 60 will protrude into hole 54 and the lower edge of prong 60 will bear against edge 54A of chassis 50 in hole 54, holding display module 14 securely within housing 26.

It may be desirable to remove display module 14 for servicing. A disassembly tool may be used to help service personnel disengage spring prong 60 from hole 54. To perform disassembly operations, trim 74 (FIG. 4) may be removed from device 10. This will expose a gap between cover glass 52 and housing 26 (i.e., the gap G in FIG. 7). Spring 56 may have a laterally extending portion 82. Portion 82 may extend outwardly from the center of display 14 towards housing wall 26A. The disassembly tool may have a rotating fin structure that bears against tool engagement surface 90 of tool engagement recess 88. By rotating the disassembly tool to press against surface 90, spring 56 can be bent around axis 58 to release spring prong 60 from hole 54. Once released in this way, display module 14 can be removed from housing 26 for servicing.

Figure 9:
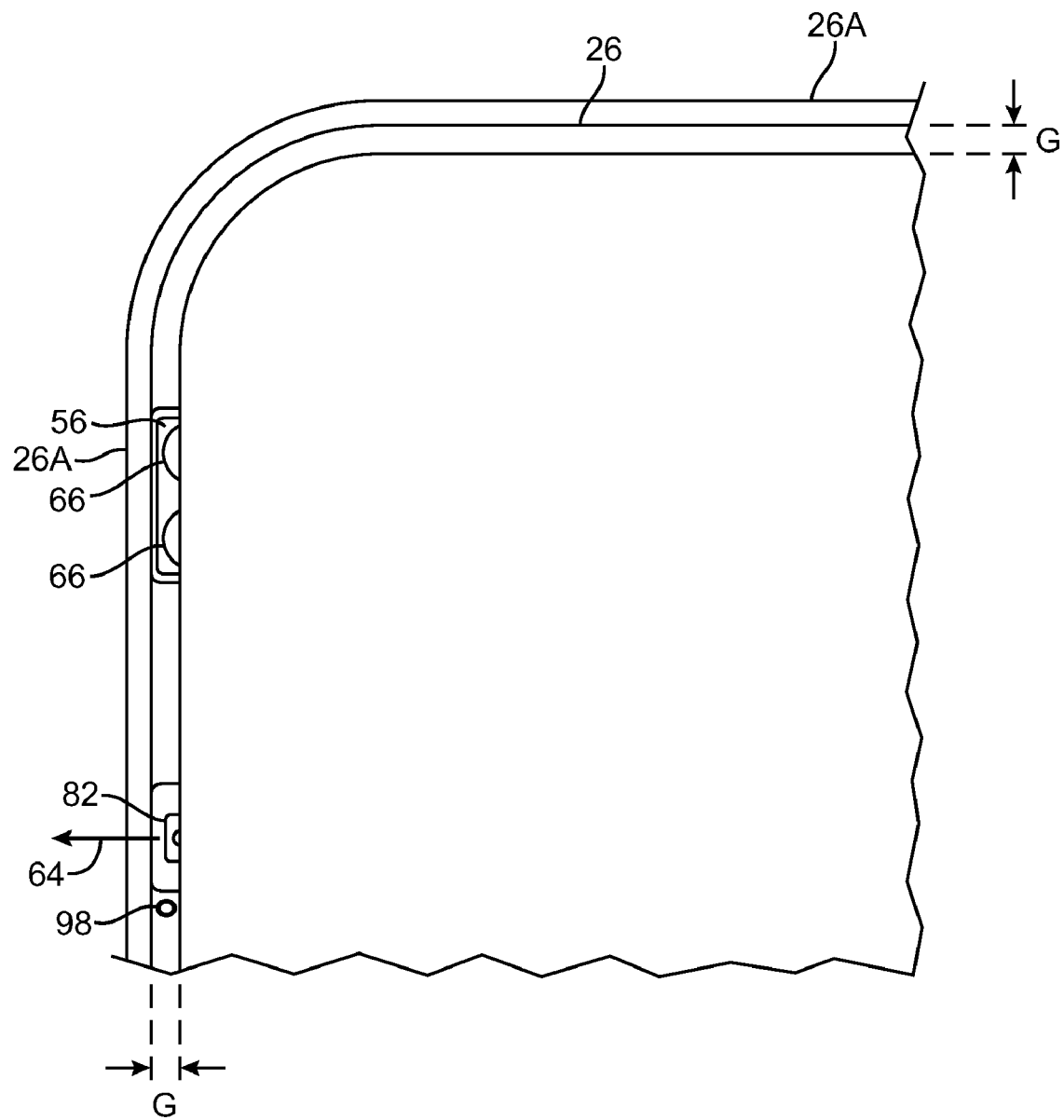
FIG. 9 is a top view of a portion of an electronic device showing how there may be a gap between a cover glass structure and a peripheral housing wall when an elastomeric trim member has been removed from the electronic device in accordance with an embodiment of the present invention.

The location of gap G when trim 74 has been removed is shown in the top view of FIG. 9. As shown in FIG. 9, the outermost tip of spring portion 82 may be accessible through gap G. Housing 26 may have a cylindrical hole such a hole 98. The longitudinal axis of hole 98 may run in and out of the page in the orientation of FIG. 9. Hole 98 may serve as a pilot hole that receives and guides the tip of a disassembly tool shaft to guide the shelf as the disassembly tool is rotated.

Figure 10:
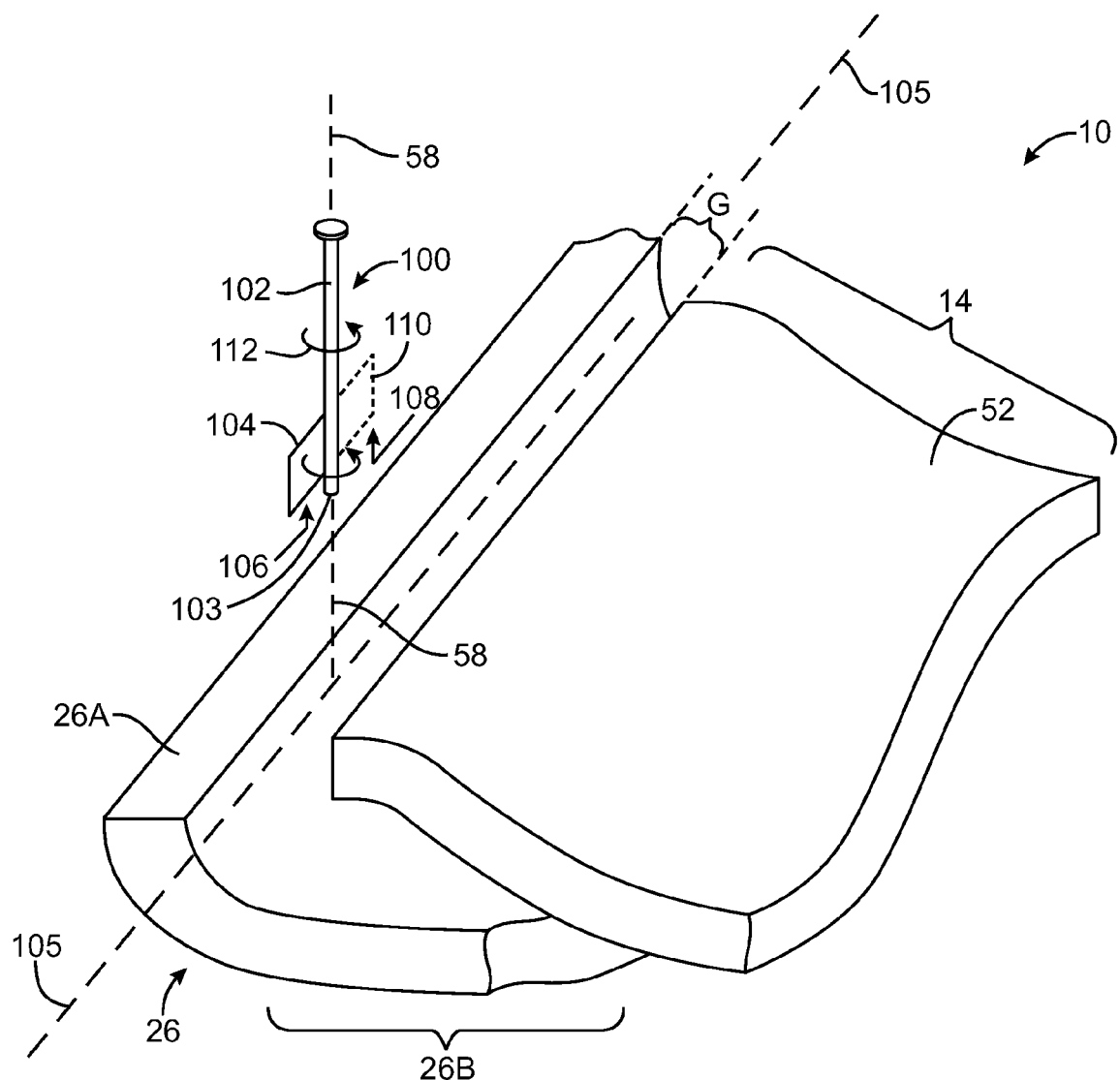
FIG. 10 is a perspective view of a portion of a display module mounted in an electronic device in which a gap between a peripheral housing wall and a cover glass member allows a disassembly tool to be inserted for use in disengaging display mounting springs during disassembly operations in accordance with an embodiment of the present invention.

FIG. 10 is a perspective view of a portion of device 10 from which trim member 74 has been removed to expose gap G. As shown in FIG. 10, disassembly tool 100 may have a shaft such as shaft 102 with a tip such as tip 103. Tip 103 may fit into pilot hole 98 in housing 26 (FIG. 9). Fin 104 of tool 100 may fit through gap G (e.g., when the longitudinal axis of fin 104 is aligned with longitudinal axis 105 of gap G. Initially, fin 104 may be placed in position 106 (as an example). After inserting tip 103 of tool 100 into hole 98, a user can rotate shaft 102 in counterclockwise direction 112 about rotational axis 58 towards position 108 (shown by dashed lines 110).

Figure 11:
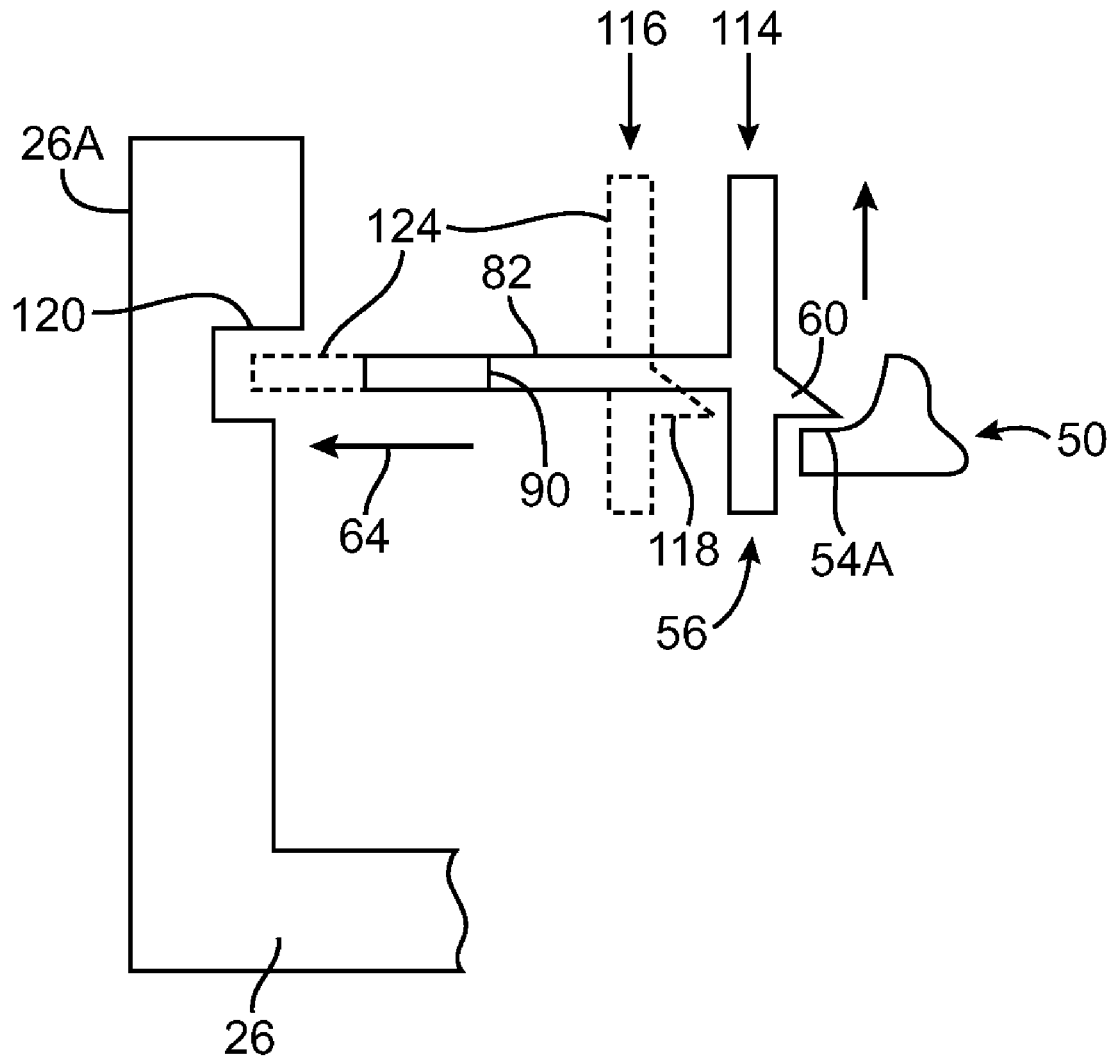
FIG. 11 is a cross-sectional side view of an illustrative spring and mating engagement structure showing how the spring and engagement structure may be disengaged using a disassembly tool during disassembly operations in accordance with an embodiment of the present invention.

As fin 104 rotates about axis 58, the tip of fin 104 engages surface 90 of spring portion 82 (FIG. 8), thereby biasing spring portion 56A outwards. As shown in FIG. 11, spring 56 is initially unflexed so that the lower surface of prong 60 engages surface 54A on the edge of the opening in chassis member 50. As fin 104 presses against surface 90 of spring 56, spring 56 moves to the position shown by dashed line 124. In this position, lower surface 118 of spring prong 60 moves out of opening 54 in chassis member 50 and disengages from edge 54A. This allows display module 14 to be removed from housing 26. If desired, housing wall 26A may be provided with a recess such as undercut portion 120 to accommodate the laterally outermost portion of spring member 82. This helps reduce the size of gap G.

Figure 12:
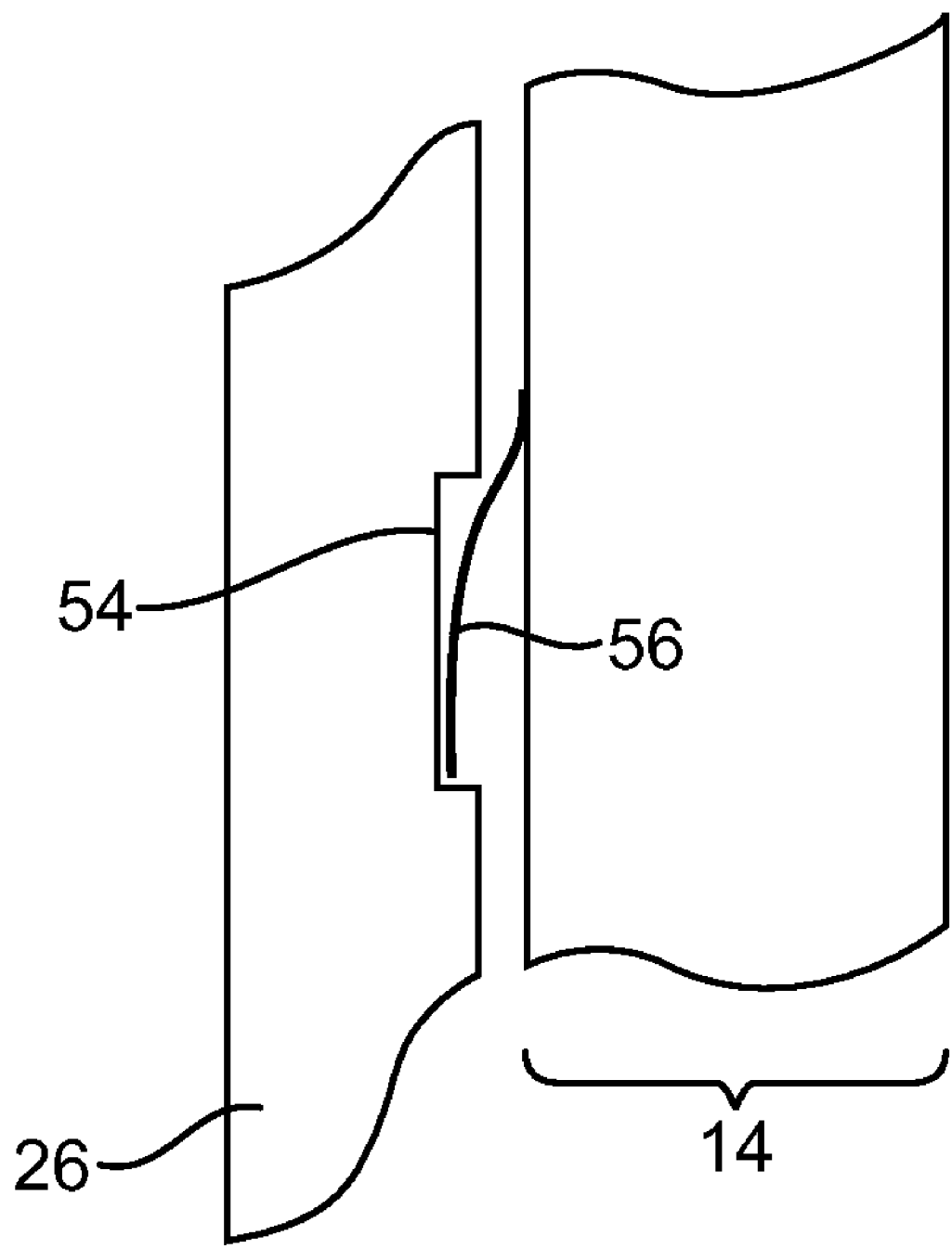
FIG. 12 is a top view of a portion of an illustrative electronic device showing how one or more springs on a display module may mate with corresponding holes or other spring engagement structures on a housing of the device in accordance with an embodiment of the present invention.

Although examples of electronic device configurations in which springs are formed on the device housing and mating engagement structures such as holes are formed on a corresponding display module, one or more springs such as spring 56 may, if desired, be formed on display module 14 and one or more corresponding spring engagement structures such as hole 54 may be formed as part of device housing 26, as shown in FIG. 12. Moreover, device components other than display modules can be mounted to housing 26 using spring and spring engagement structures. Arrangements in which these structures are used to mount display module 14 into housing 26 have been described herein as an example.

The foregoing is merely illustrative of the principles of this invention and various modifications can be made by those skilled in the art without departing from the scope and spirit of the invention.

What is claimed is:

1. An electronic device, comprising:
    a housing having a planar rear surface and peripheral housing sidewalls with springs; and
    a display module mounted in the housing that has holes that mate with the springs, wherein each of the springs has a longitudinal axis that runs parallel to a respective adjacent one of the housing sidewalls and each of the springs has a flex axis that is perpendicular to the planar rear surface.

2. The electronic device defined in claim 1 wherein each spring has a spring prong with a surface engages an edge of a respective one of the holes.

3. The electronic device defined in claim 2 wherein display module comprises a metal chassis member in which the holes are formed.

4. The electronic device defined in claim 3 wherein each spring comprises a portion that is configured to engage a rotating portion of a disengagement tool to release the display module when disassembling the electronic device.

5. The electronic device defined in claim 4 wherein the housing comprises at least one pilot hole into which a shaft tip in the disengagement tool is inserted when disassembling the electronic device.

6. The electronic device defined in claim 5 wherein the at least one pilot hole lies beneath a gap between a cover glass member in the display module and opposing portions of the housing.

7. The electronic device defined in claim 1 wherein the springs comprise holes through which screws pass to screw the springs to the housing.

8. The electronic device defined in claim 1 wherein the springs each comprise a sloped lead-in tab portion.

9. The electronic device defined in claim 8 wherein the display module comprises a metal chassis with portions that bear against the sloped lead-in tab portion and cause the springs to flex about the flex axis.

10. The electronic device defined in claim 1 wherein each spring has a first portion with screw holes that is screwed to the housing and a second portion with a prong that flexes about the flex axis.

11. The electronic device defined in claim 10 wherein each spring further comprises a disassembly tool engagement structure.

12. A portable computer, comprising:
a lower housing;
an upper housing;
a display module mounted in the upper housing; and
a hinge between the lower housing and the upper housing, wherein the upper housing comprises housing sidewalls to which a plurality of springs are mounted, wherein the display module comprises openings into which the springs protrude to hold the display module in the upper housing, wherein the display module has a planar surface, and wherein the springs flex about a flex axis that is perpendicular to the planar surface of the display module.

13. The portable computer defined in claim 12 wherein the display module comprises a metal chassis member in which the openings are formed.

14. The portable computer defined in claim 13 further comprising a cover glass layer that covers the springs.

15. The portable computer defined in claim 14 wherein the housing comprises peripheral housing sidewalls, the portable computer comprising:
an elastomeric trim between the cover glass and the peripheral housing sidewalls; and
a disassembly tool pilot hole in the housing beneath the trim.

16. A method of disassembling an electronic device with a housing sidewall with at least one flexible spring and a display module with at least one hole that mates with the spring so that the spring holds the display module in the electronic device, comprising:
rotating a disassembly tool to release the spring from the hole.

17. The method defined in claim 16 wherein the electronic device has a cover glass that covers the display module, wherein the cover glass has a peripheral edge, and wherein the peripheral housing sidewalls are configured to form a gap between the peripheral housing sidewalls and the peripheral edge of the cover glass, and wherein the electronic device has an elastomeric trim member that covers the gap, the method comprising:
removing the elastomeric trim to expose the gap before rotating the disassembly tool to release the spring from the hole.

18. The method defined in claim 17 wherein the housing comprises a pilot hole and wherein the disassembly tool comprises a shaft with an end, the method comprising:
inserting the end of the shaft of the disassembly tool into the pilot hole after removing the elastomeric trim and before rotating the disassembly tool to release the spring from the hole.

19. The method defined in claim 18 wherein the cover glass has a planar surface, wherein the disassembly tool comprises a fin member connected to the shaft, wherein the spring rotates about a flex axis that is perpendicular to the cover glass, wherein the spring comprises a disassembly tool engagement structure, and wherein rotating the disassembly tool comprises rotating the fin until the fin presses against the disassembly tool engagement structure on the spring and causes the fin to flex about the flex axis.

20. An electronic device, comprising:
a housing having a planar rear surface;
a display module mounted in the housing;
at least one spring that flexes about a flex axis that is perpendicular to the planar rear surface; and
a spring engagement structure that holds the display module to the housing by engaging the spring.

21. The electronic device defined in claim 20 wherein the spring engagement structure comprises an opening in the display module and wherein the spring is formed on the housing.

22. The electronic device defined in claim 21 wherein the electronic device comprises a portable computer having hinged upper and lower housing portions and wherein the display module is mounted in the upper housing portion using the spring and the opening.

23. The electronic device defined in claim 20 wherein the spring engagement structure comprises an opening in the housing and wherein the spring is formed on the display module.

* * * * *